(12) United States Patent
Fokken et al.

(10) Patent No.: US 8,403,266 B2
(45) Date of Patent: Mar. 26, 2013

(54) ATTACHMENT STRUCTURE FOR AFFIXING INTERIOR EQUIPMENT COMPONENTS OF AN AIRCRAFT PASSENGER CABIN

(75) Inventors: Markus Fokken, Hamburg (DE); Rüdy Gysemberg, Hamburg (DE); Johannes Gonnsen, Hamburg (DE); Uwe Johannsen, Steinkirchen (DE); Helge Tiede, Gross Wittensee (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/120,923

(22) Filed: May 15, 2008

(65) Prior Publication Data
US 2008/0277527 A1 Nov. 13, 2008

Related U.S. Application Data

(63) Continuation of application No. PCT/EP2006/011012, filed on Nov. 16, 2006.

(30) Foreign Application Priority Data

Nov. 17, 2005 (DE) .................. 10 2005 054 890

(51) Int. Cl.
*B64C 1/06* (2006.01)
(52) U.S. Cl. ...................................... 244/131
(58) Field of Classification Search .......... 244/131, 244/118.5, 118.1, 129.1; 403/408.1; 52/204.5, 52/204.51, 243.1, 55
See application file for complete search history.

(56) References Cited

U.S. PATENT DOCUMENTS

| 4,648,570 | A | 3/1987 | Abdelmaseh |
| 4,947,762 | A | 8/1990 | Perzl et al. |
| 5,083,727 | A | 1/1992 | Pompei et al. |
| 5,108,048 | A | 4/1992 | Chang |
| 5,255,610 | A * | 10/1993 | Enderlein ............ 105/156 |
| 6,003,813 | A * | 12/1999 | Wentland et al. ...... 244/118.5 |
| 6,007,024 | A | 12/1999 | Stephan |
| 6,318,671 | B1 | 11/2001 | Schumacher et al. |
| 6,536,710 | B1 | 3/2003 | Bobzien et al. |
| 6,758,325 | B2 * | 7/2004 | Greeley ............... 198/687.1 |
| 6,883,753 | B1 * | 4/2005 | Scown ............... 244/118.1 |
| 7,080,727 | B1 * | 7/2006 | Sanderson ........... 198/680 |

(Continued)

FOREIGN PATENT DOCUMENTS

| DE | 214910 | 4/1973 |
| DE | 4423691 | 1/1996 |

(Continued)

OTHER PUBLICATIONS

European Patent Office, Summons to Attend Oral Proceedings for European Application No. 06818599.0, Jan. 18, 2010.

(Continued)

*Primary Examiner* — Tien Dinh
*Assistant Examiner* — Valentina Xavier
(74) *Attorney, Agent, or Firm* — Ingrassia Fisher & Lorenz P.C.

(57) ABSTRACT

An attachment structure is provided by which interior equipment components of an aircraft passenger cabin can conveniently be affixed. The attachment structure includes, but is not limited to at least one system support that above the cabin floor extends at least along the spacing of two frame elements. The system support has a longitudinal extension along which it comprises a plurality of attachment means, evenly spaced apart from each other, for affixing interior equipment components, wherein the spacing of the attachment means is smaller than the spacing of the frame elements.

15 Claims, 6 Drawing Sheets

U.S. PATENT DOCUMENTS

| | | | |
|---|---|---|---|
| 7,270,297 B2 * | 9/2007 | Schaefer et al. | 244/137.1 |
| 2003/0019976 A1 | 1/2003 | Cheung | |
| 2007/0295862 A1 * | 12/2007 | Hupperich et al. | 244/118.5 |

FOREIGN PATENT DOCUMENTS

| | | |
|---|---|---|
| DE | 10017410 | 10/2001 |
| EP | 0463757 A2 | 1/1992 |
| EP | 0514957 A1 | 11/1992 |
| EP | 0718189 A1 | 6/1996 |
| EP | 0767100 A1 | 4/1997 |
| EP | 0930229 A2 | 7/1999 |
| EP | 1279593 A2 | 1/2003 |
| GB | 2169256 A | 7/1986 |
| RU | 1362300 A1 | 2/2005 |

OTHER PUBLICATIONS

Japanese Patent Office, Japanese Office Action dated Dec. 6, 2011 for Japanese Application No. 2008-540519.

* cited by examiner

ATTACHMENT STRUCTURE FOR AFFIXING INTERIOR EQUIPMENT COMPONENTS OF AN AIRCRAFT PASSENGER CABIN

CROSS-REFERENCE TO RELATED APPLICATIONS

This is a continuation of International Application No. PCT/EP2006/011012, filed Nov. 16, 2006, which application claims priority to German Application No. 10 2005 054 890.3, filed Nov. 17, 2005, which are hereby incorporated by reference in their entirety.

TECHNICAL FIELD

The present invention generally relates to the technical field of equipment installation in aircraft. In particular, the invention relates to an attachment structure by which interior equipment components of an aircraft passenger cabin can conveniently be affixed. Furthermore, the invention relates to an aircraft whose fuselage structure comprises a passenger cabin in which such an attachment structure is provided.

BACKGROUND

Generally speaking, interior equipment components in aircraft passenger cabins are attached, at the foot end to or in the cabin floor, and/or at the head end in the ceiling region of the passenger cabin. Such interior equipment components include, for example, hat racks, galleys, storages, purser working stations, entertaining control centers, or class dividers, which overall within the context of the present invention are designated by the term "interior equipment components."

For attachment of the interior equipment components at the foot end, component- and position-related screwed connections such as, for example, seat rails may be used, which have even attachment spacing in a longitudinal direction of the aircraft. In contrast to this, for attachment of the interior equipment components at the head end, as a rule framework components are used that at the upper fuselage structure of the aircraft are individually designed in relation to the respective interior equipment components and their installation positions, as well as specially milled structures. These structures introduce loads to the fuselage that comprises frame elements, stringers and an exterior skin, which loads are caused by the interior equipment components.

In the case of such conventional attachment of interior equipment components with the use of specially designed framework components and milled structures for attaching the interior equipment components at the head end, attachment may be individually matched to the desired cabin configuration. Thus, advantages provided by the even hole spacing or attachment spacing in the seat rails in the cabin floor, or provided by comparable structures on the fuselage side, may not be used for interior equipment components that are to be attached at the head end.

Conventional attachment of interior equipment components thus results in comparatively inflexible cabin configurations, which can be converted only with considerably construction effort. Thus any change in the cabin configuration, for reasons of structural attachment of the interior equipment components with the use of specially designed framework components and corresponding milled structures alone, may result in a large number of components that have to be specially replaced. Furthermore, such extensive changes in the cabin configuration may be carried out by specially certified development enterprises with the participation of the relevant approval authorities, which in the case of reconfiguration of the cabin may result in considerable financial expenditure due to extended downtimes.

Starting from the above-described known way of attaching interior equipment components in passenger cabins, which way of attaching components may result in a relatively inflexible cabin configuration, there may be a need to state an implementation by which interior equipment components can be attached relatively flexibly in a passenger cabin in contrast to the known way of attaching interior equipment components. In addition, other needs, desirable features and characteristics will become apparent from the subsequent summary, detailed description, and the appended claims, taken in conjunction with the accompanying drawings and this background.

SUMMARY

According to an exemplary embodiment of the invention, an attachment structure is provided that is arranged for affixing interior equipment components in a passenger cabin of a fuselage structure, which attachment structure, among other things, comprises frame elements, spaced apart from each other in longitudinal direction of the fuselage. In this arrangement, the attachment structure may comprise at least one system support that above the cabin floor extends at least along the distance of two frame elements. In order to make possible a less rigid and more flexible affixation of the interior equipment components to the system support, the system support may have a longitudinal extension along which it may comprise a plurality of attachment means, evenly spaced apart from each other, for affixing interior equipment components, wherein the spacing of the attachment means may be smaller than the spacing of the frame elements.

Any notion, in this document, of the system support extending above the cabin floor can mean that the system support extends in the upper region of the passenger cabin, or on the other side of the ceiling paneling of the passenger cabin, in longitudinal direction of the fuselage structure, in the crown of the fuselage structure. While flexible attachment of interior equipment components can be achieved already if the system support extends only from one frame element to the next, the flexibility of attachment can be improved if the system support extends over more than only two frame elements, for example in longitudinal direction along the entire length of the passenger cabin. With the use of the attachment elements, which are provided at even spacing along the longitudinal extension of the system support, flexible attachment of interior equipment components at the head end in a passenger cabin can be ensured. Because the attachment elements may be, for example, spaced apart from each other so as to be one inch apart, interior equipment components may be affixed to any desired position at one-inch spacing in longitudinal direction of the passenger cabin, wherein an individual and easily reconfigurable cabin configuration may be ensured. The system supports themselves may, for example, be I-, U-, T- or simple rectangular profiles, seen in cross section, for example made from flat steel, along which profiles the above-mentioned attachment elements are arranged at regular spacing, which attachment elements in a simple case may be simple boreholes.

In order to make possible the simple and flexible attachment of interior equipment components, for example hat racks in the middle region of the passenger cabin, at least one system support may be arranged in the region of the crown of the aircraft structure, wherein the longitudinal direction of the system support may extend longitudinally in relation to the fuselage. In this arrangement the system support may be suspended from the fuselage structure by suitable components so as to extend within the crown of the fuselage structure.

While it may be possible to attach the at least one system support to any desired position above the cabin floor, indirectly to the aircraft structure, efficient attachment, at the head end, of interior equipment components may however be achieved in that the system support may be arranged above the aircraft seats in the head region of the passenger cabin, or even on the other side of the ceiling paneling of the passenger cabin. As already indicated, the system supports may be attached indirectly to the aircraft structure, for example to the stringers or frame elements; however, it is of course also possible to attach the system supports directly to the stringers or frame elements so that they may extend directly along the aircraft structure in longitudinal direction of the aircraft.

In order to be able to attach the system supports indirectly to the aircraft structure, the attachment structure may further comprise a suspension device, for example in the form of a fitting or a rod assembly that is designed for attaching the system support above the cabin floor to the aircraft structure, for example to the frame elements or stringers. By such a suspension device the system supports may be arranged at any desired height in the passenger cabin, which may be expedient in particular for the attachment of hat racks.

Ordered and structured suspension of the system supports may be achieved in that the suspension devices may be arranged so that they extend in planes defined by the frame elements, wherein the suspension devices may be attached at least indirectly to the frame elements and so that a free end may extend in the direction of the passenger cabin, at which free end the system support can be attached. The system support thus may extend frame element by frame element from suspension device to suspension device so that the respective frame element fields may be essentially free of any attachment elements, with the space thus being available for other installations.

In order to provide the attachment structure with spatial rigidity, the attachment structure may furthermore comprise a stiffening bar that is designed to stiffen the suspension device in longitudinal direction of the fuselage. To this effect, a directional component of the stiffening bars may extend in longitudinal direction of the fuselage. In this arrangement, one end of the respective stiffening bar may be connected to the region of the free end of the suspension device, while the other end may be connected to a frame element so that the stiffening bar may extend at an inclination in relation to the fuselage, thus achieving the desired stiffening effect.

As has become clear from the above explanations, the attachment structure according to an exemplary embodiment of the invention makes possible flexible attachment of interior equipment components because these components may be attached to the system support at any desired position in longitudinal direction of the aircraft passenger cabin. Such flexibility may be in particular achieved by the grid that is created by the attachment means that are evenly spaced apart from each other on the system support.

In order to be able, with the attachment structure according to an exemplary embodiment of the invention, to attach interior equipment components in a passenger cabin not only at the head end but also at the foot end, the attachment structure may further comprise at least one attachment rail situated in the floor of the passenger cabin. This attachment rail may, for example, be a seat rail that may extend parallel to the system support, with a plurality of attachment elements, evenly spaced apart from each other, for affixing the interior equipment components, being provided in the attachment rail. To avoid any further restrictions in relation to the flexibility of the attachment structure according to an exemplary embodiment of the invention as a result of the attachment rail that is situated in the cabin floor, the spacing of the attachment elements of the attachment rail may be selected such that it corresponds with the spacing of the attachment the system support. In this way the flexibility, which may be provided by the system support, may be maintained even in the case of attachment at the foot end, by an attachment rail.

Reliable, simple and easy-to-install attachment of the system may support the suspension devices, and/or attachment of the suspension devices, and/or of the stiffening bars to the aircraft structure may be implemented by way of a double-shear strap connection. In this case suitable straps may be screwed, riveted or welded for example to the frame elements, to which straps the suspension devices or the stiffening bars may be attached with a fork-like double-shear strap connection. Correspondingly, the free end of the suspension device may comprise a corresponding strap, to which the system support may be connected by a double-shear plate fork connection.

In order to make it possible to adjust the attachment structure, the above-mentioned connection may comprise an articulation mechanism that permits tilting or swiveling of the strap connection on an axis that may extend parallel in relation to the longitudinal extension of the system support.

While it can be adequate to affix an interior equipment component at the head end with the use of a system support, for reliably affixing interior equipment components at least two system supports may be arranged parallel in longitudinal direction of the fuselage. They may, for example, be suspended from the fuselage structure at the crown of the fuselage, as mentioned above, or they may be attached to lateral sections of the fuselage, either indirectly or directly to the stringers or frame elements.

According to a further embodiment of the present invention, an aircraft with a fuselage structure may be provided that among other things is formed by frame elements spaced apart from each other in longitudinal direction of the fuselage, wherein the fuselage structure may comprise a passenger cabin in which an attachment structure is provided as described in the paragraphs above.

BRIEF DESCRIPTION OF THE DRAWINGS

Below, the invention is explained in an exemplary manner with reference to the enclosed drawings. In all the figures, identical or similar elements have the same or corresponding reference characters. The diagrams are not necessarily to scale, but they are suitable for reproducing qualitative size relationships. The following are shown.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
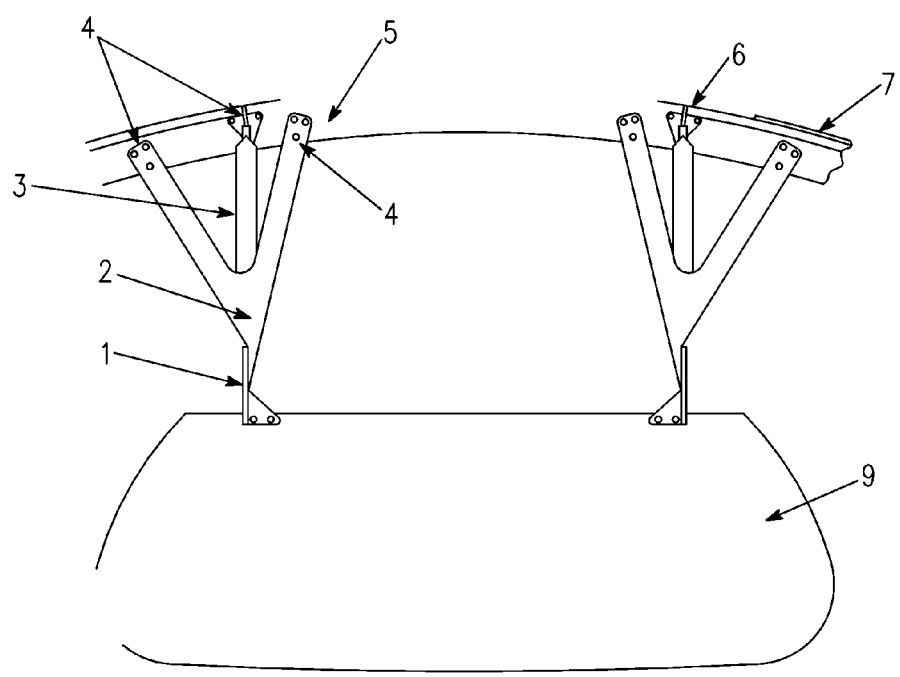
FIG. 1 provides a diagrammatic cross-sectional view of the attachment structure according to an exemplary embodiment of the invention, viewed in longitudinal direction of a fuselage.
Figure 2:
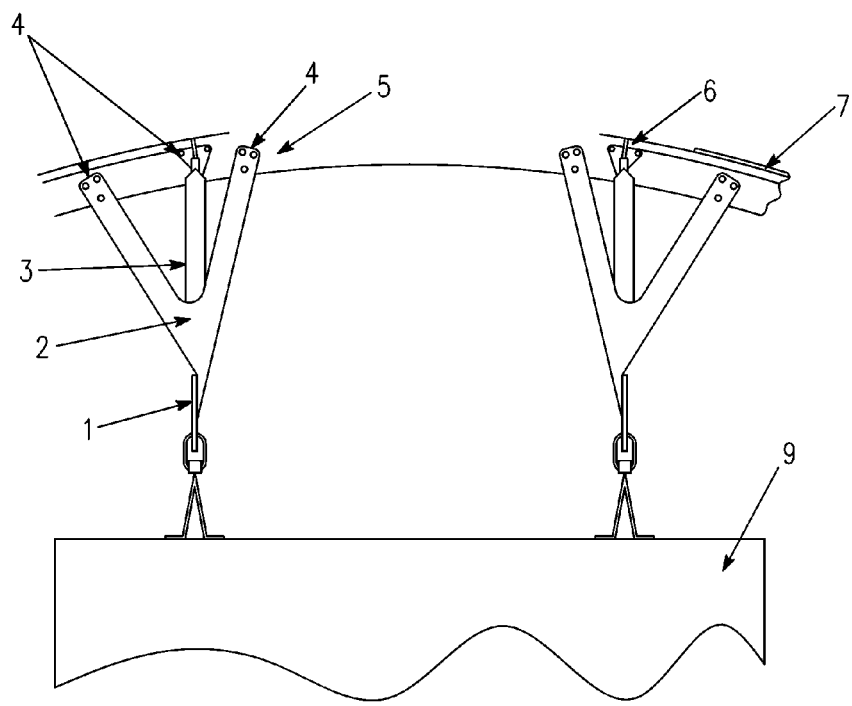
FIG. 2 shows a further diagrammatic cross-sectional view of the attachment structure according to an exemplary embodiment of the invention, viewed in longitudinal direction of a fuselage.

FIG. 1 shows a cross section of an interior equipment component 9, which in the diagram is a center hat rack in an aircraft passenger cabin. Correspondingly, FIG. 2 shows a cross section of another interior equipment component 9, which can, for example, be a galley. Both the center hat rack 9 shown in FIG. 1 and the galley 9 shown in FIG. 2 are attached to an aircraft structure 5, 6, 7 with the use of the attachment structure according an embodiment of the invention, which in the example shown comprises frame elements 5, arranged so as to be spaced apart from each other in longitudinal direction of a fuselage, stringers 6 commencing in longitudinal direction of the fuselage structure, as well as an exterior skin 7 (see also FIG. 3).

Figure 3:
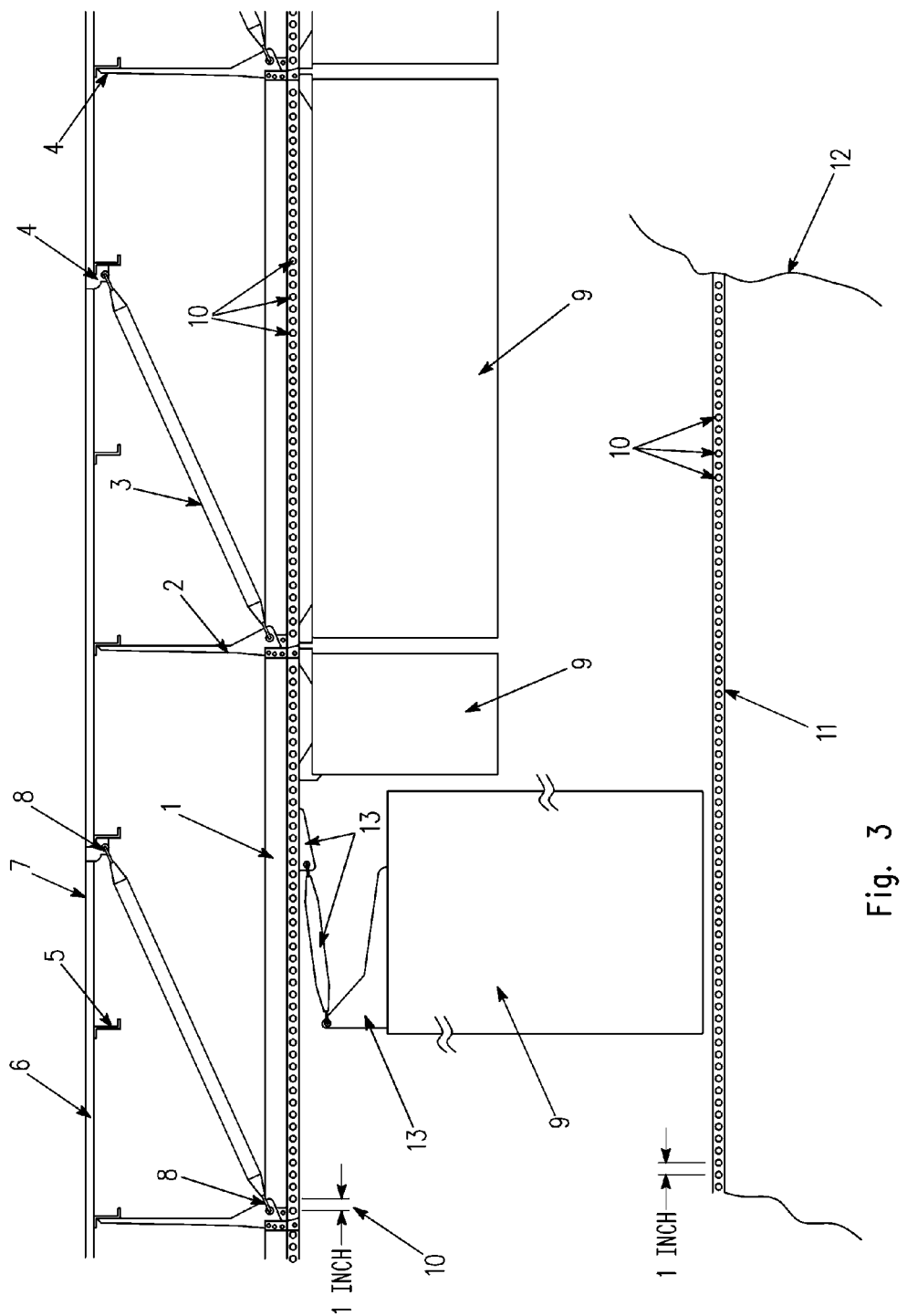
FIG. 3 shows a lateral view of the attachment structures shown in FIGS. 1 and 2.

The attachment structure according to an exemplary embodiment of the invention, which attachment structure is shown in FIGS. 1 to 3, essentially comprises two system supports 1 that extend parallel to the fuselage structure, in each case two suspension devices 2 that are attached as a pair to a frame element 5, as well as stiffening bars 3 that extend in longitudinal direction of the fuselage, which stiffening bars 3 on the one hand are connected to the free ends of the suspension devices 2, and on the other hand are connected to the fuselage structure, in particular to frame elements 5.

The suspension devices 2 are fittings that open out in a fork-like manner, which fittings extend in the planes defined by the frame elements 5, and are at least indirectly attached to the frame elements 5. In contrast to this, at their free ends, by which the suspension devices project into the passenger cabin, the suspension devices 2 are connected, by way of suitable attachment elements, to the respective interior equipment components 9. In the embodiments of FIGS. 1 and 2, the suspension devices 2 are fittings that open out in a fork-like manner; however, it is of course also possible to design the respective legs of the suspension devices 2 as separate braces, which at a shared point in the region of the system support 1 are connected to said system support. The fork-like design of at least one suspension device 2 provides the attachment structure with the necessary rigidity in the direction across the fuselage. In order to stiffen the attachment structure accordingly, also in longitudinal direction of the fuselage, the free ends of the suspension devices 2 are connected to the fuselage by way of the above-mentioned stiffening bars 3, as shown in FIG. 3. In this arrangement the stiffening bars extend at an inclination to horizontal so that with at least one directional component they extend in longitudinal direction of the fuselage. The stiffening bars 3 thus support the suspension devices 2 in longitudinal direction of the fuselage, which suspension devices are, for example, arranged on each third frame element, thus providing the attachment structure with the required rigidity in this direction.

As shown in FIG. 3, a system support extends between each two adjacent suspension devices 2, wherein it is of course also possible to allow a single system support to extend over several suspension devices 2, quasi as a through-support.

As shown in FIG. 3, the system supports 1 are elongated profile supports with a longitudinal dimension along which they comprise a plural number of attachment means 10, at least substantially evenly spaced apart from each other, for affixing interior equipment components 9. As shown by the dimensions in FIG. 3, the attachment means 10 can, for example, be arranged at a regular spacing of one inch from each other, wherein it is of course also possible to select multiples thereof or entirely different spacing. As will be explained below, a spacing of about one inch is expedient as this ensures that interior equipment components 9 can be attached both at the head end and at the foot end at almost any desired position in longitudinal direction of a fuselage structure.

As is most clearly shown in FIG. 3, a hat rack 9 as well as a smaller special hat rack 9 has been attached by way of suitable fittings 13 at the head end to the system supports 1, for example by way of screw connections in attachment means 10, which attachment means 10 can be simple holes. Analogously, by way of corresponding fittings, the galley 9 is also attached at the head end to the system support 1.

As is diagrammatically shown in FIG. 3, along the cabin floor 12 a seat rail 11 extends in longitudinal direction of the fuselage structure, which seat rail 11 also comprises suitable attachment means in increments of one inch. While these seat rails 11 are normally used to attach the individual seat rows, the rails 11, in conjunction with the system supports 1 at the head end, can also be used, for example, to attach tall interior equipment components 9, such as for example galleys, by their foot end too. By installing the above-mentioned system supports 1 at the head end along the fuselage so as to supplement the seat rails 11, the flexibility that is provided anyway by the seat rails 13 can also be used for the installation of tall interior equipment components 9. By attaching interior equipment components 9 to system supports 1 at the head end and to seat rails 11 at the foot end, which comprise attachment means 10 that match their spacing, it is thus possible to attach interior equipment components 9 at any desired position in longitudinal direction of a fuselage so that very flexible cabin configuration becomes possible.

Figure 6:
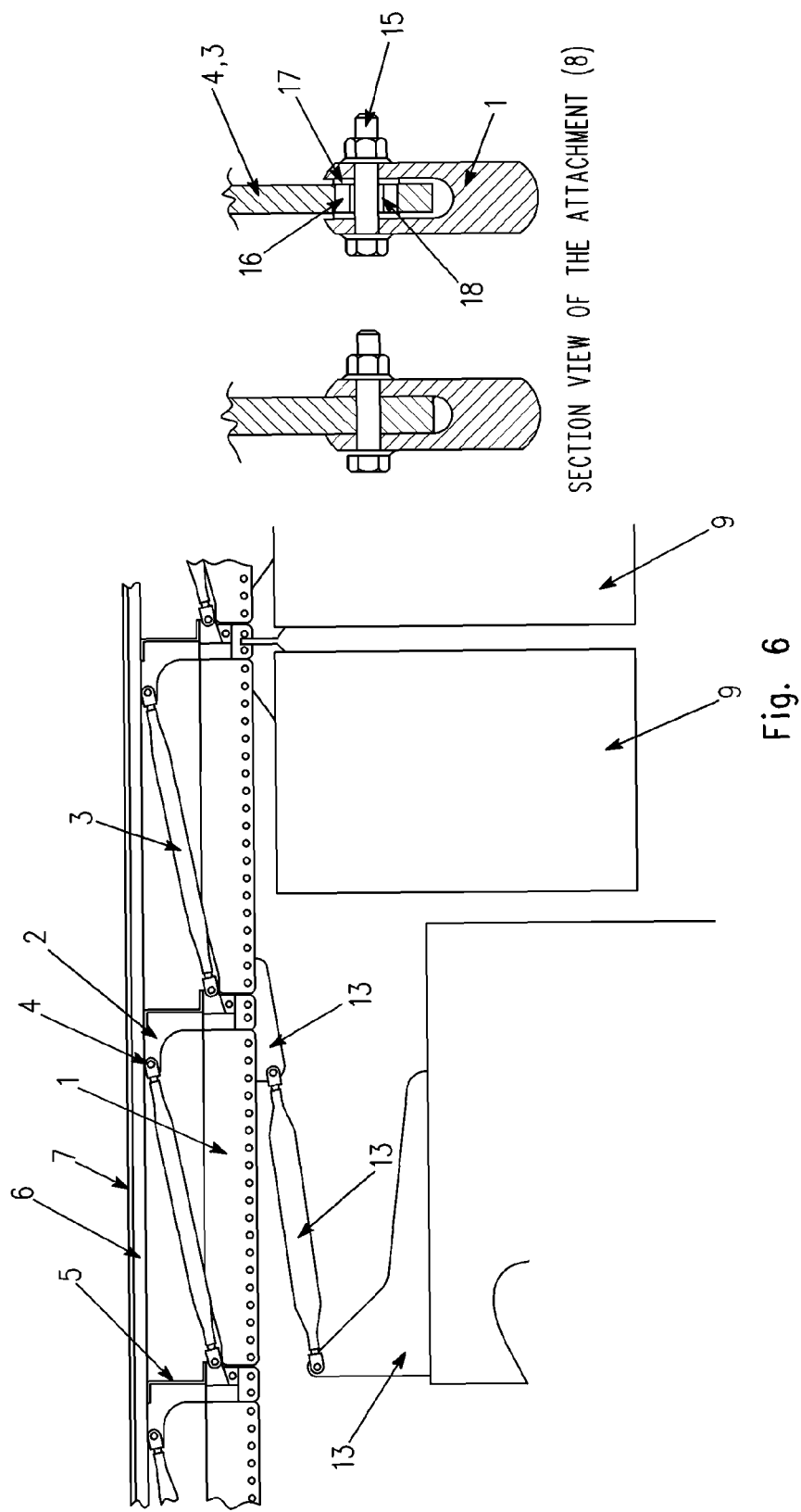
FIG. 6 shows a lateral view of the attachment structures shown in FIGS. 4 and 5.

In order to make possible simple installation of the interior equipment components 9 that are installed in a passenger cabin with the use of the attachment structure according to an exemplary embodiment of the invention, it is possible to design the system supports 1 on the suspension devices 2, and /or the attachment of the suspension devices 2 as well as of the stiffening bar 3 on the aircraft structure 5, 6 by way of a double-shear strap connection 8, as will, in particular, be described later with reference to FIG. 6. This strap connection 8 comprises an articulation mechanism that allows tilting of the strap connection 8 on an axis that extends parallel to the longitudinal extension of the system support 1 so that the strap connection 8 can easily be adjusted during installation of interior equipment components.

Figure 4:
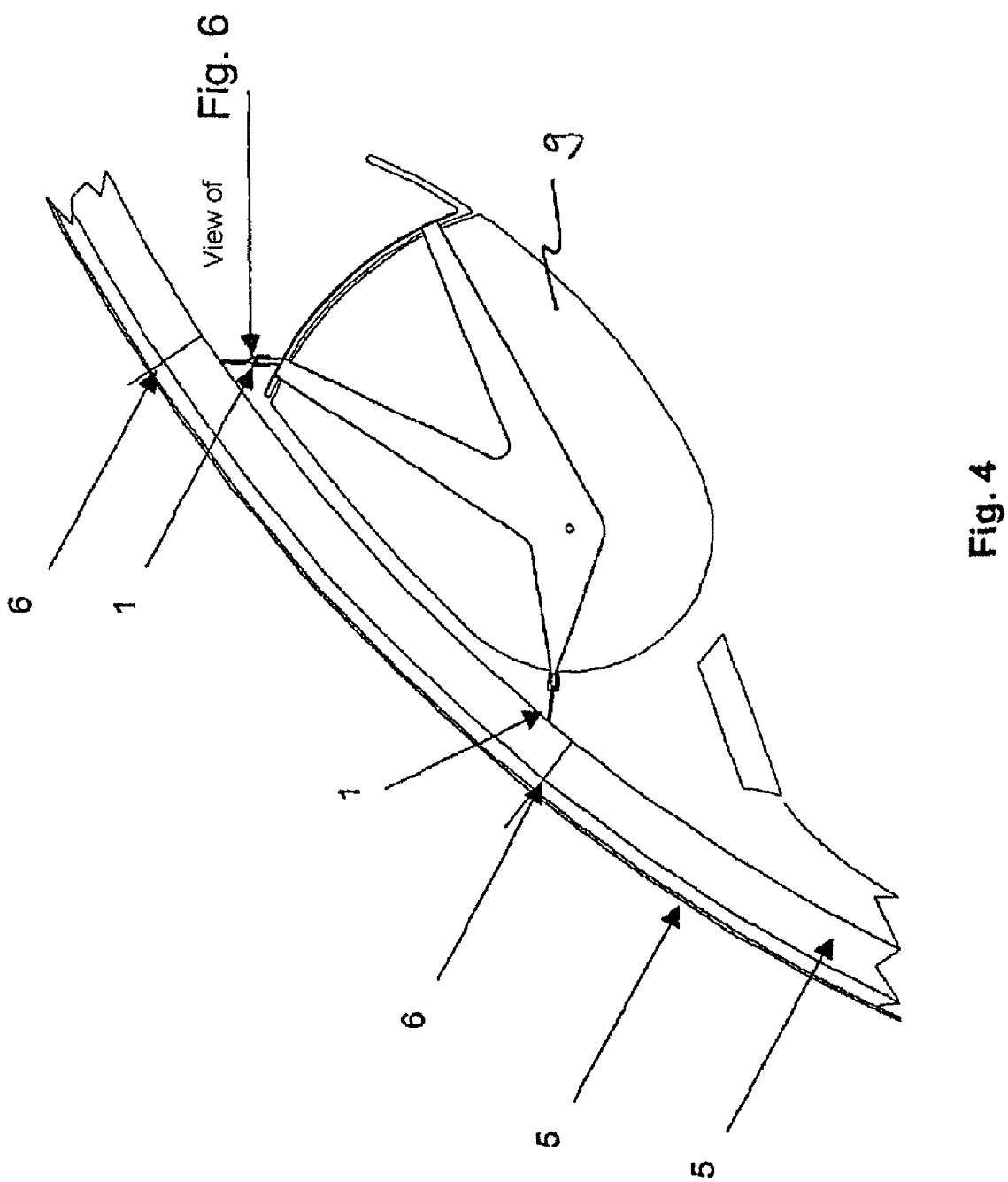
FIG. 4 shows a further diagrammatic cross-sectional view of another exemplary embodiment of the attachment structure according to the invention, viewed in longitudinal direction of a fuselage.
Figure 5:
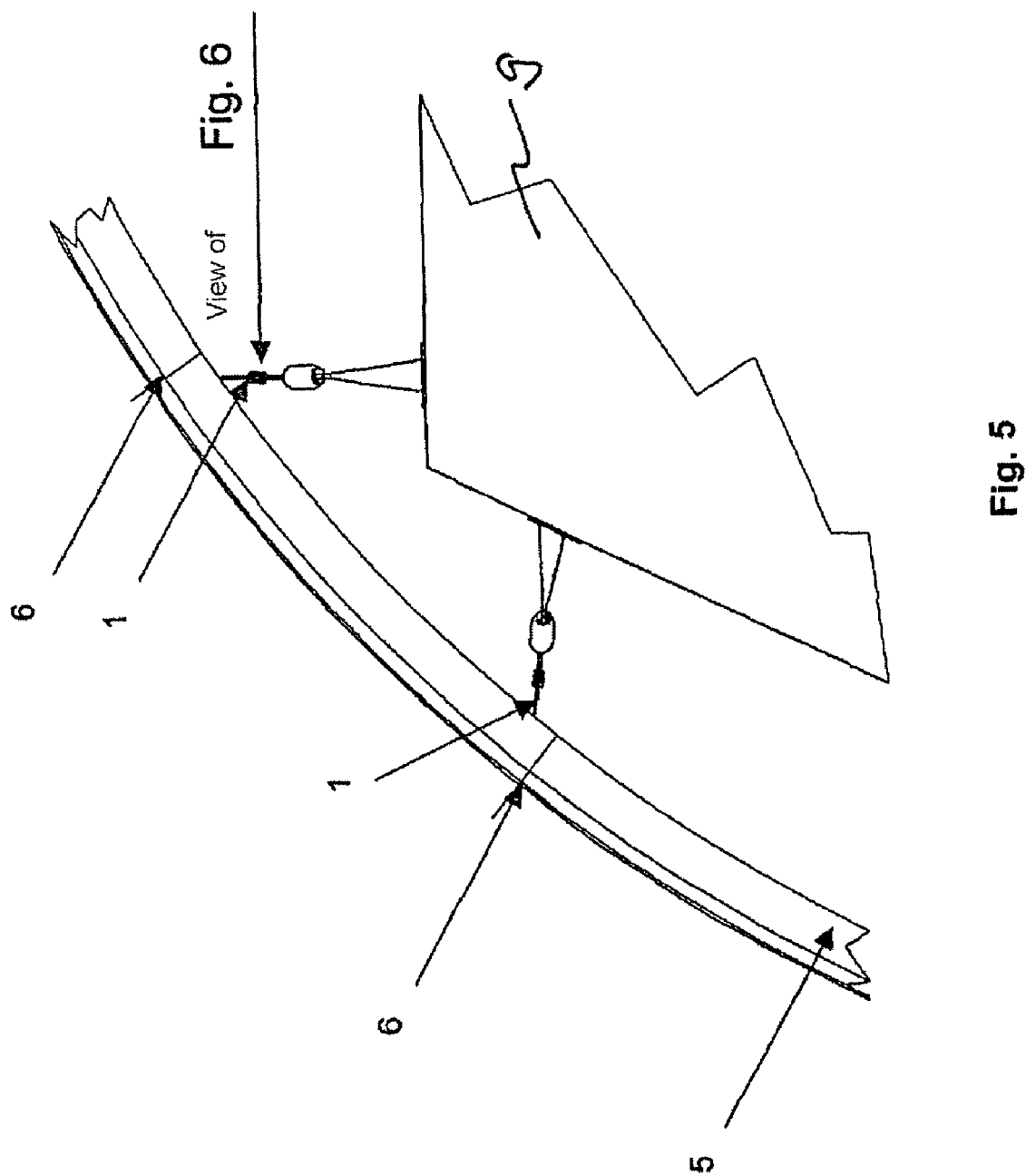
FIG. 5 shows yet another cross-sectional view of the attachment structure according to the invention, viewed in longitudinal direction of a fuselage.

Below, with reference to FIGS. 4 to 6, a further embodiment of the attachment structure according to the invention is described, in which embodiment the system supports 1 rest directly against the frame elements 5, as shown in FIGS. 4 and 5. While it would be possible to attach the system supports according to FIGS. 4 and 5 directly to a frame element 5, for example by weld connections, such permanent attachment of the system supports 1 to the frame elements 5 is not always advantageous, which is why the system supports 1 are again attached by way of suspension devices 2 that in turn are connected to the frame elements 5, for example by way of screwing, welding or riveting, with said system supports 1 thus extending from one frame element 5 to the respective adjacent frame element 5 or to the suspension devices 2 attached thereto. With this embodiment, too, the suspension devices 2 have been stiffened by way of stiffening bars 3 at an inclined angle towards the fuselage so that the attachment structure, when viewed in longitudinal direction of the aircraft, provides the rigidity.

Although not shown in FIG. 6, in the attachment structure shown therein, corresponding seat rails extend in the cabin floor so that in the attachment structure shown in FIG. 6, too, the variability afforded by the increments in the seat rails and in the system supports 1 can be used to advantage. Thus interior equipment components 9 can be attached in longitudinal direction of the aircraft structure to almost any desired position, both to the seat rails, at the foot end, and to the system supports 1 that extend parallel to the seat rails, at the head end. Because the increments of the attachment means 10 in the system supports 1 agree with the increments of the attachment means 10 in the seat rails, an interior equipment component 9 can be attached also at the head end and/or laterally, at least indirectly, to the fuselage, at almost any position in which it can be attached at the foot end. Thus, with the attachment structure according to an exemplary embodiment of the invention, the variability that the seat rails provide in relation to various cabin configurations can be fully utilized.

Finally, with reference to the two cross-sectional views in FIG. 6, which views show two double-shear strap connections 8, attachment of the respective components 1, 2, 3 of the attachment structure according to an exemplary embodiment of the invention among each other as well as to the fuselage 5, 6 is discussed. The left cross-sectional view of a connection of two components shows a normal strap connection that is secured by a stud 15. While all the components 1, 2, 3, 4 of the attachment structure according to an exemplary embodiment of the invention, which attachment structure comprises such a double-shear strap connection, can be connected with each other, such a double-shear strap connection is, however, very rigid, in particular during installation, and uses very precise matching of the individual components among each other.

However, in order to allow slight rotation or tilting of the interior equipment components 9 during installation of the attachment structure or when the attachment structure is subject to loads, the respective components 1, 2, 3, 4 of the attachment structure (system supports, suspension devices, stiffening bars, straps) can be interconnected to a double-shear strap connection as shown in the right-hand cross-sectional view of FIG. 6. In this strap connection the component that comprises a fork has an inside fork clearance that is slightly larger than the thickness of the strap accommodated by the fork. In the strap a through-hole 16 is provided, in which a fitting body 17 is inserted, which fitting body 17 in turn comprises a tilting cylinder 18 that can rotated on its longitudinal axis in the fitting body 17. The tilting cylinder 18 comprises a through-opening through which a stud 15 extends so as to connect the strap to the fork-like component. The ability of the fitting body 17 to rotate in relation to the tilting cylinder 18 ensures that the strap can tilt slightly in the fork of the fork-like body so that components that are connected to such a strap connection can be slightly tilted in relation to each other, which in particular can be advantageous among other things during installation.

Because individual components of the attachment structure according to the exemplary embodiment of the invention are equipped with such a tilt able strap connection, simple installation of interior equipment components 9 can be ensured. Furthermore, interior equipment components 9 attached in this way can move slightly in their installed state so that no forced tension occurs.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents. In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above.

What is claimed is:

1. A fuselage cabin comprising an attachment structure for affixing interior equipment components in an aircraft passenger cabin, the attachment structure comprising:
   a plurality of frame elements;
   at least one attachment rail arranged in a floor of the fuselage cabin;
   a first suspension device;
   a system support;
   wherein the plurality of frame elements are arranged so as to be spaced apart from each other with a first spacing in longitudinal direction of the fuselage cabin,
   wherein the first suspension device is arranged so that it extends in a plane defined by the plurality of frame elements and such that a free end of the first suspension device extends into the passenger cabin, such that the system support is spaced from the plurality of frame elements by the first suspension device without any direct contact between the plurality of frame elements and the system support, at which free end of the first suspension device the system support is attached to the first suspension device;
   wherein at least one interior equipment component is attached to the system support without being directly attached to the plurality of frame elements;
   wherein the system support extends above the floor of the fuselage cabin more than two frame elements;
   wherein the system support has a longitudinal extension along which the system support comprises a plurality of attachment elements, evenly spaced apart from each other with a second spacing, for affixing interior equipment components;
   wherein the second spacing of the attachment elements is smaller than the first spacing of the frame elements; and
   wherein a length of the attachment rail extends parallel to the system support, with a plurality of attachment elements, evenly spaced apart from each other, for affixing the interior equipment components, being provided in the attachment rail, wherein the attachment elements of the attachment rail and the attachment elements of the at least one system support are aligned.

2. The fuselage cabin of claim 1, wherein the system support is arranged in a region of a crown of the fuselage cabin, wherein a longitudinal direction of the system support extends longitudinally in relation to the fuselage cabin.

3. The fuselage cabin of claim 1, wherein the system support extends along an entire length of a passenger cabin.

4. The fuselage cabin of claim 1, wherein the system support is at least indirectly attached to an aircraft structure.

5. The fuselage cabin of claim 1, further comprising a second suspension device that is arranged for attaching the system support above a cabin floor to the aircraft structure.

6. The fuselage cabin of claim 5, wherein the second suspension device extends in a plane defined by the plurality of frame elements, wherein the second suspension device is attached at least indirectly to the frame elements so that a free end extends in the direction of the passenger cabin, at which free end the system support is attached.

7. The fuselage cabin of claim 5, further comprising at least one stiffening bar that is arranged for stiffening the second suspension device in a longitudinal direction of the fuselage cabin.

8. The fuselage cabin of claim 7, wherein at least one directional component of the at least one stiffening bar extends in the longitudinal direction of the fuselage cabin, wherein one end of the at least one stiffening bar is connected to a region of the free end of the second suspension device, while an other end is connected to one of the plurality of frame elements.

9. The fuselage cabin of claim 1, wherein the system support is attached to the first suspension device by a double-shear strap connection.

10. The fuselage cabin of claim 9, wherein the double-shear strap connection comprises an articulation mechanism allowing at least one of tilting and swivelling of the double-shear strap connection on an axis that extends parallel in relation to the longitudinal extension of the system support.

11. The fuselage cabin of claim 1, wherein the first suspension device is attached to the to the aircraft structure by a double-shear strap connection.

12. The fuselage cabin of claim 11, wherein the double-shear strap connection comprises an articulation mechanism allowing at least one of tilting and swivelling of the double-shear strap connection on an axis that extends parallel in relation to the longitudinal extension of the system support.

13. The fuselage cabin of claim 1, wherein a stiffening bar is attached to the aircraft structure by way of a double-shear strap connection.

14. The fuselage cabin of claim 13, wherein the double-shear strap connection comprises an articulation mechanism allowing at least one of tilting and swivelling of the double-shear strap connection on an axis that extends parallel in relation to the longitudinal extension of the system support.

15. The fuselage cabin of claim 1, further comprising a second system support, wherein the system support and the second system support extend parallel to one another in a longitudinal direction of the fuselage and are both configured to affix an interior equipment component.

\* \* \* \* \*